Nov. 4, 1947. C. E. STAPLES Re. 22,931

RAILWAY TRAFFIC CONTROLLING APPARATUS

Original Filed Sept. 19, 1941 5 Sheets-Sheet 1

INVENTOR
Crawford E. Staples
BY
HIS ATTORNEY

RAILWAY TRAFFIC CONTROLLING APPARATUS

Original Filed Sept. 19, 1941 5 Sheets-Sheet 2

INVENTOR
Crawford E. Staples
BY
HIS ATTORNEY

Nov. 4, 1947. C. E. STAPLES Re. 22,931

RAILWAY TRAFFIC CONTROLLING APPARATUS

Original Filed Sept. 19, 1941 5 Sheets-Sheet 3

INVENTOR
Crawford E. Staples
BY
HIS ATTORNEY

RAILWAY TRAFFIC CONTROLLING APPARATUS
Original Filed Sept. 19, 1941 5 Sheets-Sheet 4
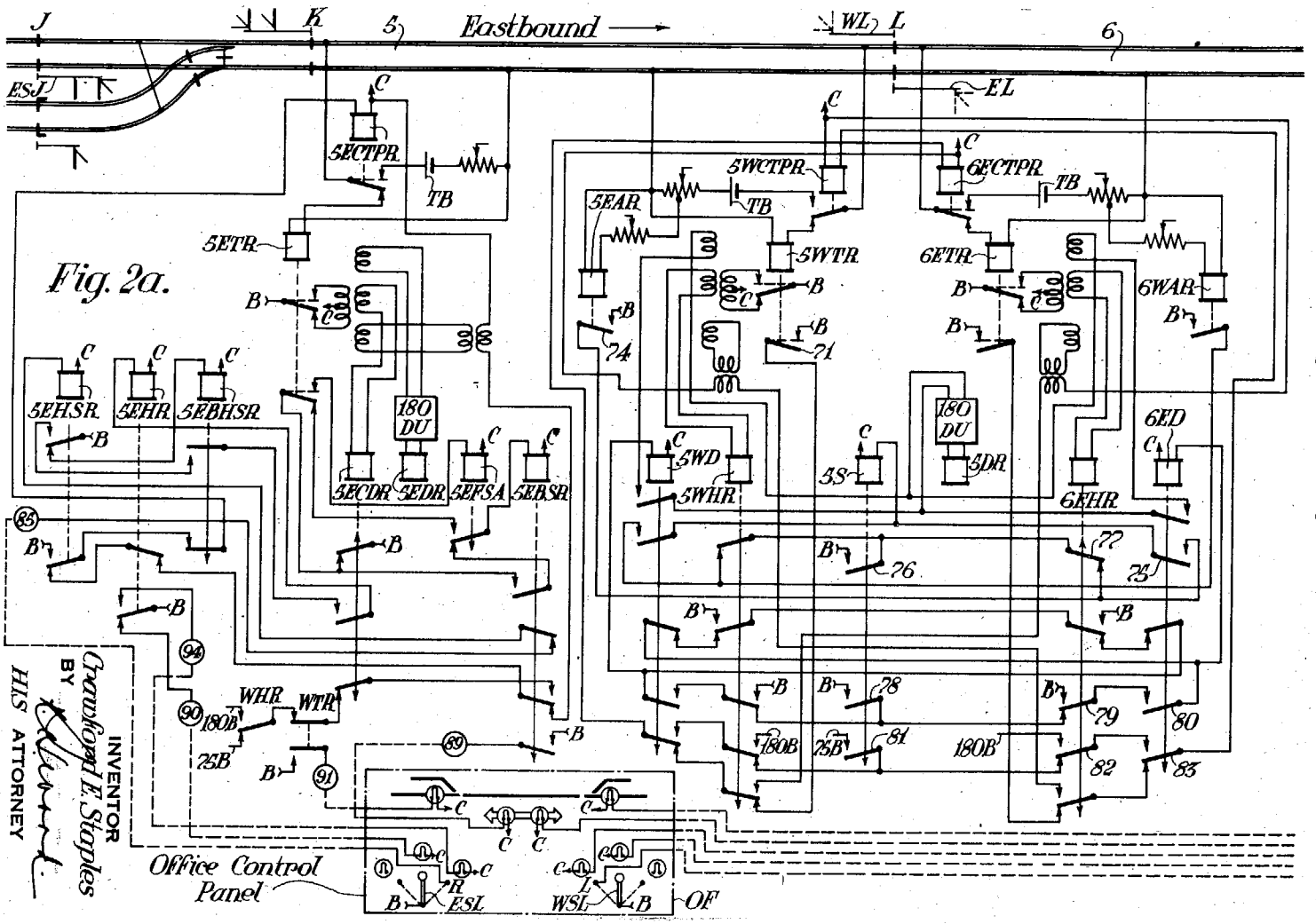
INVENTOR
Crawford E. Staples
BY
HIS ATTORNEY Nov. 4, 1947. C. E. STAPLES Re. 22,931

RAILWAY TRAFFIC CONTROLLING APPARATUS

Original Filed Sept. 19, 1941 5 Sheets-Sheet 5

INVENTOR
Crawford E. Staples
BY
HIS ATTORNEY

Reissued Nov. 4, 1947

Re. 22,931

UNITED STATES PATENT OFFICE 22,931

RAILWAY TRAFFIC CONTROLLING APPARATUS

Crawford E. Staples, Pittsburgh, Pa., assignor to The Union Switch & Signal Company, Swissvale, Pa., a corporation of Pennsylvania Original No. 2,353,421, dated July 11, 1944, Serial No. 411,481, September 19, 1941. Application for reissue April 10, 1945, Serial No. 587,634

33 Claims. (Cl. 246—3)

Figure 1A:
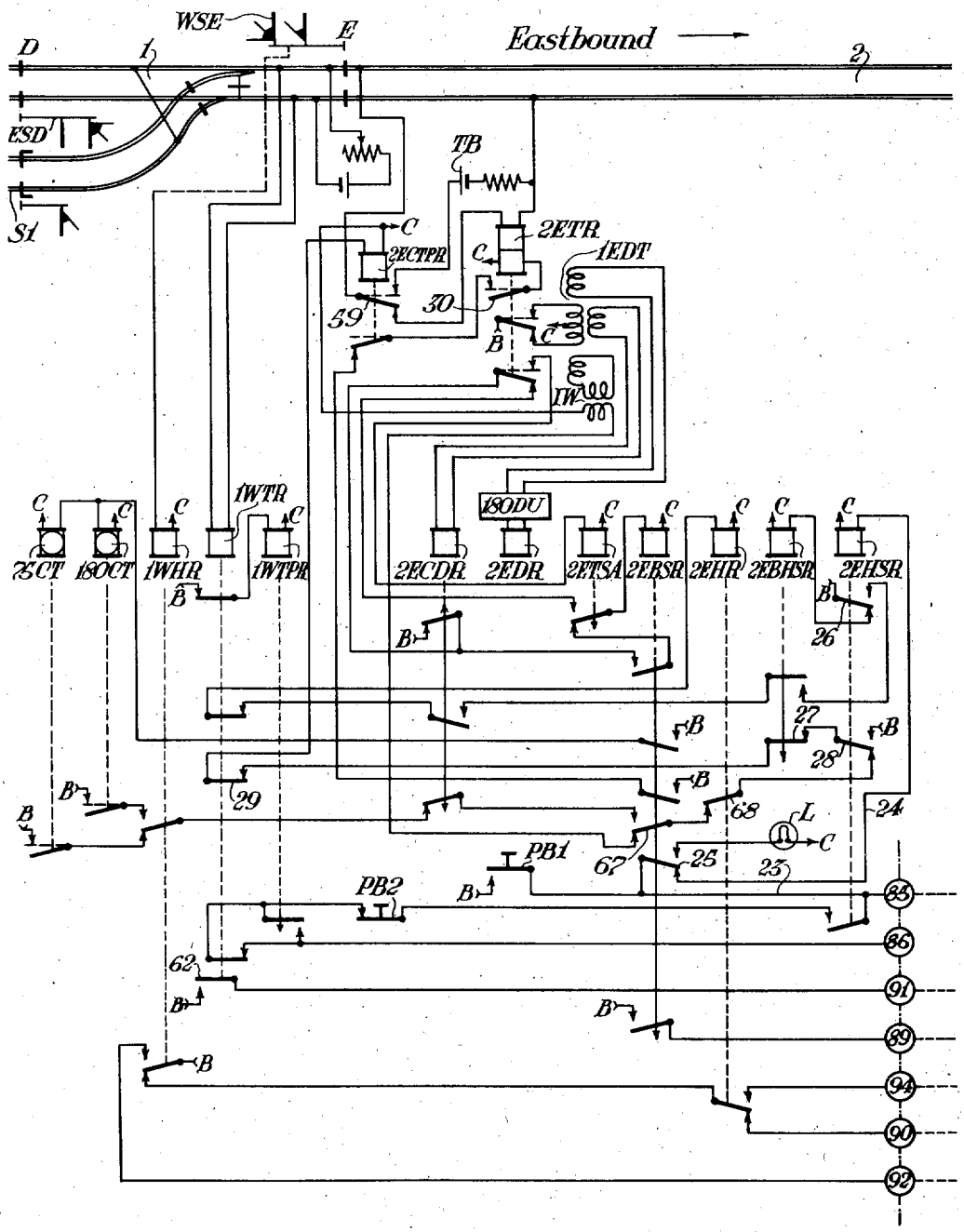

My invention relates to railway traffic controlling apparatus and is directed more particularly to apparatus for controlling traffic on a single track, two direction stretch of railroad from a central control office over a coded line circuit which may be the usual C. T. C. line. My invention dispenses with all of the usual control line wires and permits movement of trains through the stretch without requiring the operation of any of the usual traffic levers, it being sufficient to clear the entering headblock signal for the desired direction by movement of the associated signal lever in order to set up completely a given traffic direction. My invention also provides for flexible control of train movement in either direction over the stretch, from either headblock signal location in the event of failure of the coded line circuit or any of the C. T. C. equipment involved in the traffic direction control.

One object of my invention is to provide a normally deenergized system of the above type in which the control of traffic for a given direction resides predominantly in the apparatus at the entrance end for that direction. Another object of my invention is to detect unoccupancy of the single track stretch by means of an impulse of steady or uncoded energy, applying a master code thereafter for clearing the entrance signal and for establishing proper signal indications consistent with traffic conditions in advance. A further object of my invention is to employ a reverse or feed back code which follows the train and which deenergizes the track circuits when the train has passed out of the stretch. A still further object of my invention is to provide a safe, flexible, simple and economical system for controlling and expediting traffic movement over a stretch of single track, two direction railroad. Other objects, advantages and characteristic features of my invention will appear from the description which follows.

I accomplish the foregoing objects by: applying an impulse of steady energy at the entrance end for the desired traffic direction and cascading the steady energy impulse over the stretch to detect unoccupancy; registering the receipt of the steady energy impulse at the exit end whereby master code is applied at the exit end; cascading the master code over the stretch to the entrance end and clearing the headblock signal when this code is received at that end; applying a reverse code in the rear of the train and following the train with this reverse code as the train progresses over the stretch; and automatically deenergizing the coding equipment at the exit end when the train leaves the stretch and cascading the deenergizing action to the entering end so as to render the track circuits inactive in preparation for a subsequent traffic direction reversal.

My invention makes provision for the headblock signals to remain normally lighted, with the intermediate signals becoming lighted only upon the approach of a train. Also, my invention provides for following moves merely by again clearing the signal lever. The automatic restoration of the stretch to its deenergized condition speeds up operation since no manual action is required for this purpose following the passage of a train. This has the further advantage that in the event of failure of the C. T. C. line, no special action is required to restore the track circuits to their normal deenergized condition. The automatic restoration feature also eliminates the need for a traffic control lever, thus saving space on the control machine and simplifying operation.

My invention is an improvement on the apparatus shown in the application for Letters Patent of the United States, Serial No. 403,502 filed by Ralph R. Kemmerer on July 22, 1941, now Patent No. 2,316,961, dated April 20, 1943, and Serial No. 410,504, filed by James J. Vanhorn on September 12, 1941, both for Railway traffic controlling apparatus.

Figure 1B:
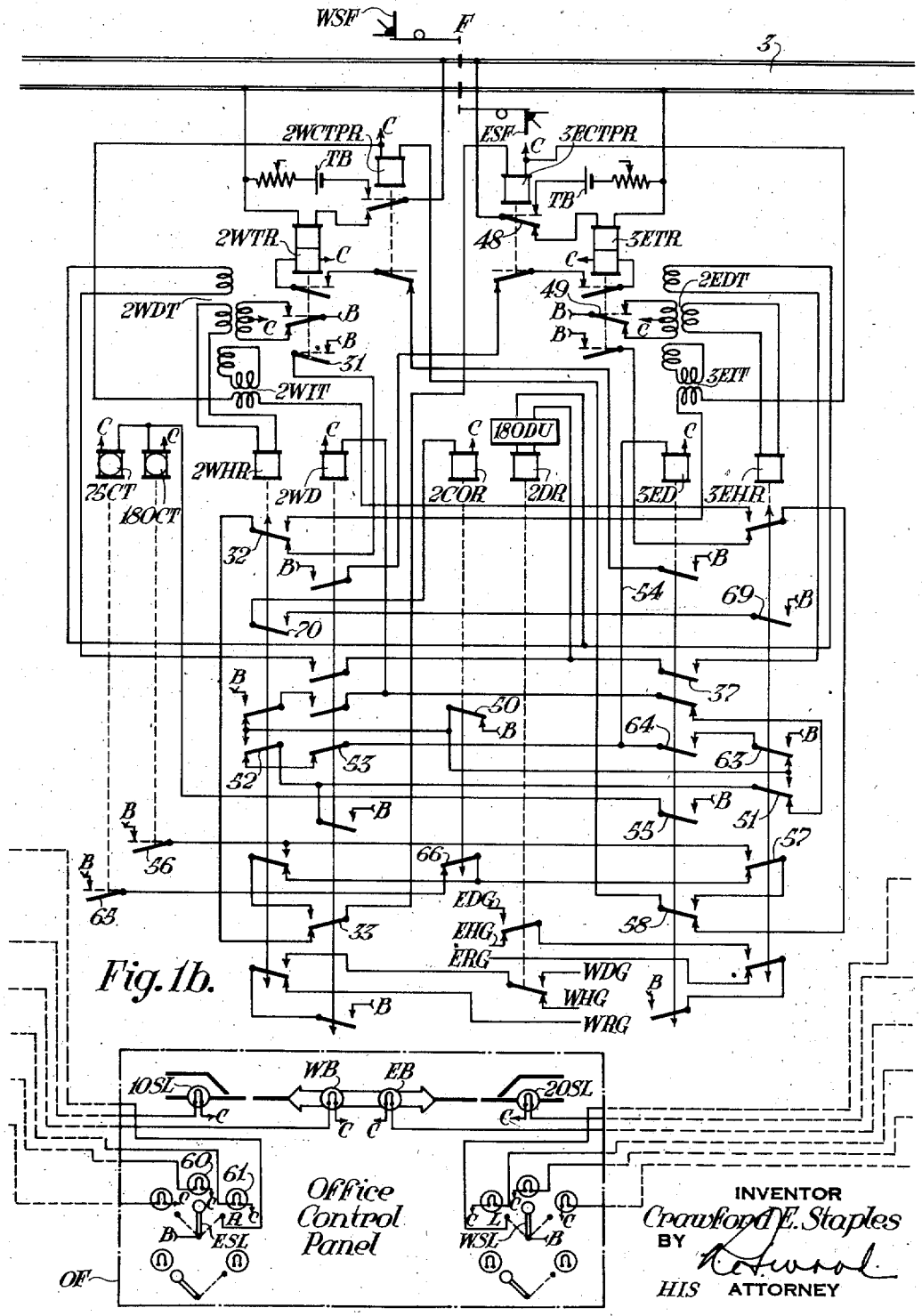
Figure 1C:
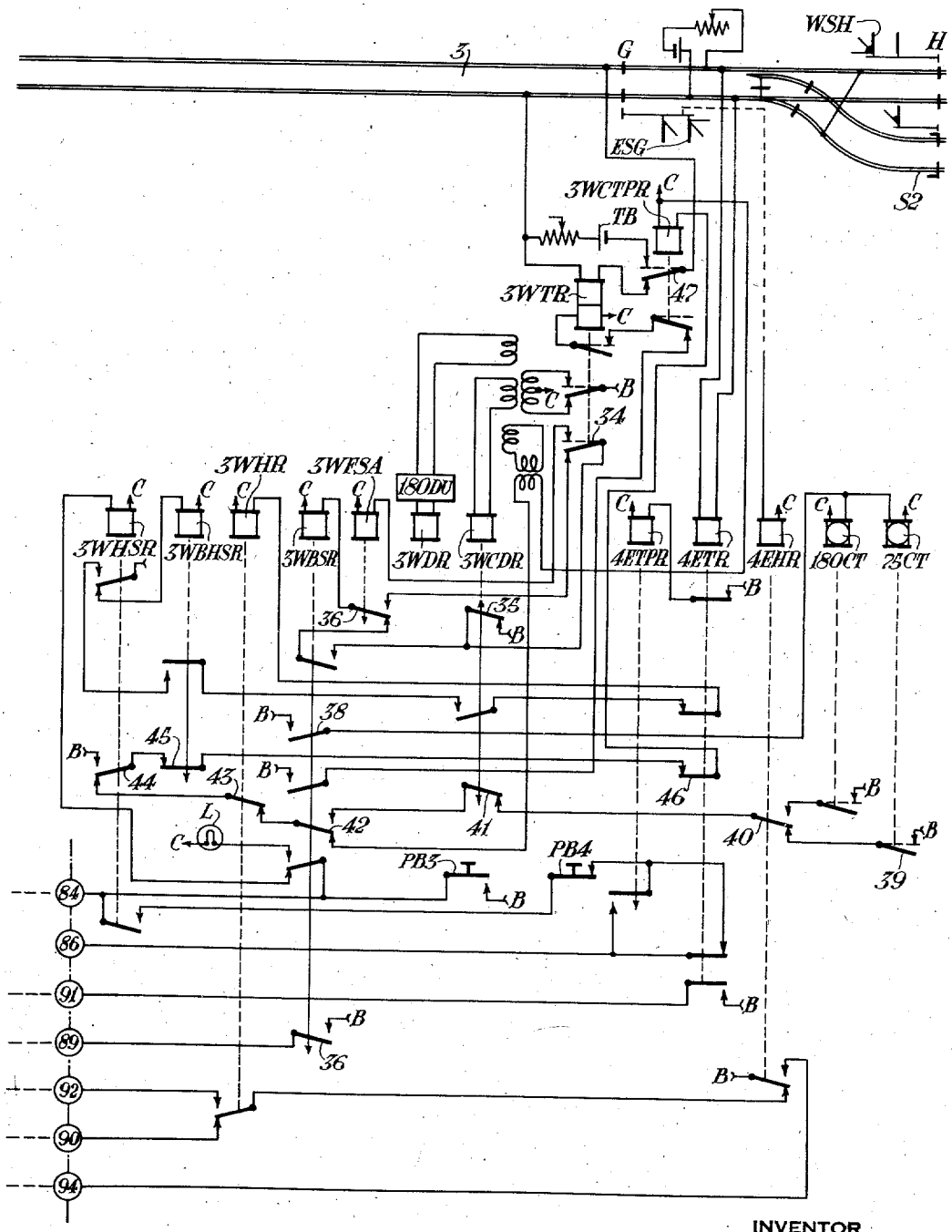
Figure 2B:
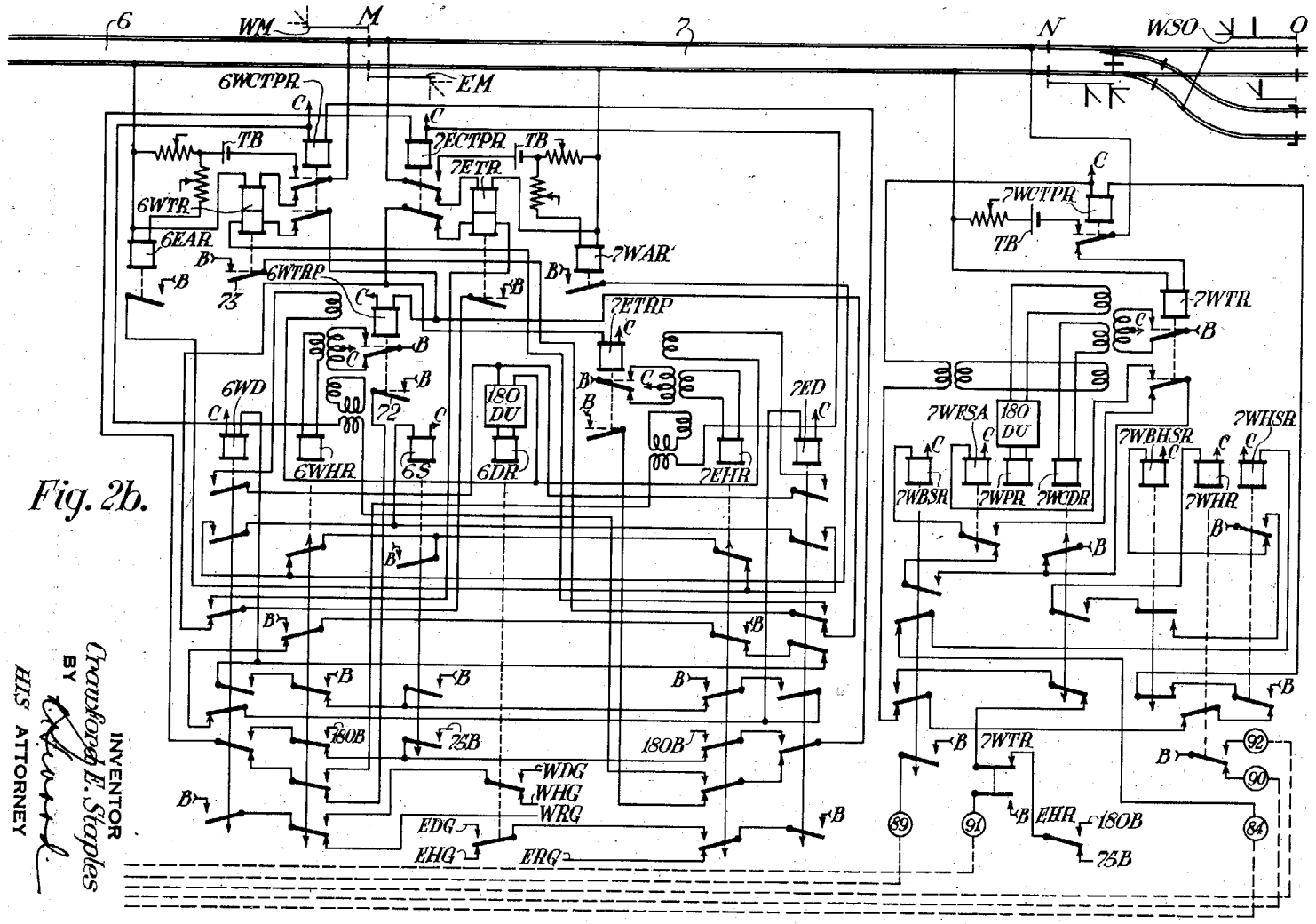

In the accompanying drawings, Figs. 1*a*, 1*b* and 1*c* when placed side by side with Fig. 1*a* at the left are a diagrammatic view showing one form of apparatus embodying my invention as applied to a stretch of single track between two passing sidings. Figs. 2*a* and 2*b* taken together, with Fig. 2*a* at the left, are a diagrammatic view showing a modified form of the apparatus of Fig. 1, also embodying my invention, and showing advance pick-up stick relays at the intermediate location to provide for following moves, instead of the usual directional stick relays as shown in Fig. 1.

Similar reference characters refer to similar parts in each of the two views.

Referring first to Figs. 1*a*, 1*b* and 1*c*, the stretch of track between the sidings S1 and S2 is divided by means of the usual insulated rail joints at locations D, E, F, G, and H into the track circuit sections 1, 2, 3, and 4. Located at the end of the siding S1 is the eastbound headblock signal ESD, and at the end of siding S2 is the corresponding westbound signal WSH, other signals being designated in a similar manner in accordance with the traffic direction which they control and their location in the stretch. The various relays are similarly designated in accordance with their function and the location or track circuit with which they are associated. The control operations for this system are initiated at the central control office or C. T. C. tower OF (Fig. 1b) by moving the eastbound signal lever ESL from its neutral or vertical position to the R position when a right-hand or eastbound move is to be made, and by moving the westbound signal lever WSL to the L position when a left-hand or westbound move is to be established.

As shown, all of the coded track circuits and the intermediate signals are deenergized, only the neutral switch track circuits 1 and 4 for the "OS" sections at the passing sidings, and the headblock signals ESD and WSH (and associated siding signals) being energized. These signals normally occupy the stop position, as shown.

When the operator wishes to permit an eastbound move through the single track stretch, he will move lever ESL at the office from its neutral to its R position and press the usual code starting button (not shown), thereby transmitting a code to the field station apparatus at location E to energize the eastbound traffic relay 2EHSR at that location. This control code is transmitted over the coded line circuit, which operation energizes terminal 85 of the field station unit. It will be understood that the coded line circuit comprises but one pair of line wires connecting the office with each field station, the broken lines which I have shown connecting the office with the various field station terminals such as 85, 86, 91, etc. being merely symbolic of code transmission which puts energy on these terminals, as required. The numbering of these terminals corresponds with the numbering shown in the United States Patent No. 2,229,249, granted to Lloyd V. Lewis on January 21, 1941, for Remote control system, and reference may be had to this patent for details of the intervening C. T. C. apparatus. This apparatus forms no part of my invention and it will be sufficient for an understanding of my invention to state that operation of the lever at the office energizes certain field station terminals whereas energization of certain other field station terminals causes energization of certain apparatus at the office as will be described hereinafter.

The circuit for relay 2EHSR includes wire 23, the back point of contact 25 of relay 2EBSR, and wire 24. The pick-up of relay 2EHSR opens the circuit for relay 2EBHSR at the back point of contact 26 but during the release time of this relay, before its front contact 27 opens, relay 2ECTPR is picked up for a period of time over a circuit which includes the front contacts 28, 27, and 29 of relays 2EHSR, 2EBHSR, and 1WTR, respectively. The pick-up of relay 2ECTPR connects the track battery TB across the track over the front point of its contact 59, thus transmitting an impulse of steady energy eastward over the single track stretch.

The steady energy impulse is received at the intermediate location F by relay 2WTR which thereupon closes its front contact 31 to energize relay 3ECTPR and so to cascade the steady energy impulse into section 3. The circuit for relay 3ECTPR includes front contact 31 of relay 2WTR and back contacts 32 and 33 of relays 2WHR and 2WD. At location G, the steady energy picks up relay 3WTR which, in closing its front contact 34, energizes relay 3WFSA over an obvious circuit which includes the back contact 35 of relay 3WCDR.

When the impulse of steady energy in track section 3 is terminated (as will occur due to the release of relay 2EBHSR and the deenergization of section 2 with the consequent release of relay 3ECTPR), relay 3WTR will release, closing the back point of its contact 34 and establishing a momentary pick-up circuit for relay 3WBSR over back contacts 35 and 34 of relays 3WCDR and 3WTR, and front contact 36 of relay 3WFSA. The pick-up of relay 3WBSR closes front contact 36 so as to energize terminal 89 of the field station unit and so to light up the eastbound traffic light EB on the office panel, thus indicating unoccupancy of the stretch. It will be understood that the energization of terminal 89 at the field station results in the transmission of an indication code to the office, which when received, causes illumination of the westbound block light EB. The impulse of steady energy which was initiated at the entrance end E has accordingly provided the operator with information that the stretch is clear. Simultaneously, the pick-up of relay 3WBSR causes operation of the code transmitters 180CT and 75CT over its front contact 38 and causes a signal control code or master code to be supplied to the track at location G for transmission over the stretch in the left-hand or westbound direction. Since the headblock signal ESG is at stop, its home relay 4EHR (shown operated by this signal through the broken line connection, for simplicity) will be released so that 75 code will be supplied to section 3 by virtue of the code operation of relay 3WCTPR over a circuit which includes the coding contact 39 of transmitter 75CT, back contacts 40 and 41 of relays 4EHR and 3WCDR, front point of contact 42 of relay 3WBSR, back contacts 43 and 44 of relays 3WHR and 3WHSR, and front contacts 45 and 46 of relays 3WBHSR and 4ETR. Relay 3WCTPR will operate its front contact 47 at the 75 code rate and will accordingly transmit 75 code from battery TB to section 3.

At the intermediate location F, relay 3ETR will have its circuit closed over the back point of contact 48 of relay 3ECTPR and so will follow the 75 code and will energize the decoding transformer 2EDT in the usual and well-known manner over its contact 49, thereby causing relay 3EHR to become energized. Pick-up of relay 3EHR energizes the eastbound directional stick relay 3ED over a circuit which includes the back contact 50 of the cut-out relay 2COR, front point of contact 51 of relay 3EHR, back contacts 52 and 53 of relays 2WHR and 2WD, and wire 54. Pick-up of the directional stick relay 3ED connects the decoding unit 180DU and the 180 code decoding relay 2DR with the eastbound decoding transformer 2EDT over its front contact 37 (rather than with the westbound decoding transformer 2WDT). The use of a common decoding relay for either direction of traffic movement is shown and described in my United States Patent No. 2,244,901 granted on June 10, 1941. Relay 3ED remains picked up thereafter over a stick circuit which includes front contacts 63 and 64 of relays 3EHR and 3ED. Pick-up of the eastbound directional stick relay 3ED energizes the code transmitters 75CT and 180CT at location F over its front contact 55. A 180 code circuit is now established for operating relay 2WCTPR which applies 180 code to section 2, the code being 180 since the forward section 3 is receiving 75 code. The circuit for relay 2WCTPR includes contact 56 of code transmitter 180CT, and front points of contacts 57 and 58 of relays 3EHR and 3ED. The 180 code is received by relay 2ETR at location E over back contact 59 of relay 2ECTPR, thus energizing the decoding transformer 1EDT and causing response not only of the code detecting relay 2ECDR which responds to either 75 or 180 code, but also of the 180 code decoding relay 2EDR which responds selectively only to 180 code because of the presence of the resonant decoding unit 180DU.

The pick-up of relay 2EDR will cause the eastbound headblock signal ESD to clear by means of signal control circuits which are well known and which therefore have not been shown in order to simplify the disclosure. The clearing of signal ESD results in the red ("stop") signal indication lamp 60 on the office panel becoming extinguished and the green ("clear") eastbound lamp 61 becoming lighted by virtue of the deenergization of terminal 90 and energization of terminal 94 of the field station unit, which action results in the transmission of appropriate codes to the office which govern the illumination of these lamps. Since the eastbound headblock signal is clear, the train may proceed over the approach or "OS" track section 1 into the single track stretch.

The presence of the train in the "OS" section D—E which includes the track switch is indicated on the office control panel by the lighting of the "OS" lamp 1OSL which results from the energization of terminal 91 of the station unit over the back contact 62 of relay 1WTR. As soon as signal ESD changes to stop, a corresponding change will occur in the indication provided by the lamps 60 and 61 on the office panel. As soon as the train accepts signal ESD and lamp 1OSL becomes lighted, the operator may restore lever ESL to its neutral position. The left-hand position of lever ESL would be used in controlling westbound traffic beyond signal WSE. The lamp associated with this position of the lever indicates whether signal WSE is at stop or at proceed.

When the train passes beyond the intermediate location F and vacates section 2, 75 master code is transmitted from this location back to location E, and feed back code is transmitted in the direction of train travel, from location E to location F. By "master code" I mean the ordinary signal control code which is employed in coded track circuit signaling; whereas by "feed back code" I mean the code which is transmitted during "off" intervals of the master code by virtue of the response of a code following relay thereto. At location F, the code transmitters will be operating since contact 55 of relay 3ED remains closed, and 75 code will therefore be supplied to section 2 by virtue of the operation of relay 2WCTPR. The 75 code operating circuit for this relay includes contact 65 of code transmitter 75CT, back contacts 66 and 57 of relays 2COR and 3EHR (now deenergized because section 3 is occupied), and front point of contact 58 of relay 3ED. Relay 2ETR at location E will follow the 75 code and will energize the decoding transformer 1EDT so that an impulse output will be delivered from the impulse winding IW for intermittently energizing the relay 2ECTPR. The circuit for relay 2ECTPR extends from one terminal of winding IW, back contacts 67, 68, and 28 of relays 2EBSR, 2EHR, 2EHSR, and front contacts 27 and 29 of relays 2EBHSR and 1WTR, to relay 2ECTPR and the other terminal of winding IW. The operation of relays 2ECTPR and 2ETR is so arranged that relay 2ECTPR closes the front point of its contact 59 to transmit a feed back impulse during the "off" interval in the 75 master code being received by relay 2ETR. The manner in which this operation takes place is well known, being described for example in United States Reissue Patent No. 21,783, granted to Herman G. Blosser on April 29, 1941, so that a detailed description of this operation is unnecessary.

As long as 75 master code is being received by relay 2ETR, impulses of feed back code are supplied to section 2 and these operate relay 2WTR at location F at the 75 code rate. Relay 2WTR (and the other track relays of my system) is provided with a stick winding which improves operation of the relay of the feed back impulses which under certain conditions may be of relatively short duration. This feature is shown and described, for example, in the United States Patent No. 2,172,893, granted to Edward U. Thomas on September 12, 1939.

When the train clears section 3 and relay 3ETR starts to operate on 75 master code, relay 3ECTPR will be energized intermittently by the impulse transformer 3EIT over the front point of contact 32 of relay 2WHR and the back point of contact 33 of relay 2WD. Relay 3ECTPR transmits the feed back code through section 3 during the "off" period of master code, as previously described. Relay 3WTR will follow the 75 feed back code and in so doing will energize relay 3WCDR and thus cause relay 3WBSR to release. The opening of front contact 38 of relay 3WBSR will deenergize the code transmitters and cut off the master code at location G. Absence of master code in section 3 will cut off the master code in section 2, since the COR relay is energized, action of which is described later, so that the track circuits of the single track stretch will all be deenergized. At the same time, the traffic light EB on the office panel will go out, indicating that the system has been deenergized and is ready for an opposing move, if desired.

As long as the train remains in the single track stretch or as long as the eastbound headblock signal ESD is cleared, the reverse code is cut off from section 3 so that relay 3WBSR remains energized and the master code is being supplied, in readiness for the clearing of the section by the train. A following move can be made at any time by the operator again clearing his signal lever ESL and pressing the code starting button (not shown). The second clearing of the signal lever cuts off the feed back code. Consequently, as long as any train is in the single track stretch, the master code cannot be cut off because of the absence of reverse code to perform the deenergizing function.

Use of the feed back code to restore the stretch to its normally deenergized condition is an important feature of my system and I shall now explain this feature more in detail. As pointed out hereinbefore, transmission of the steady energy impulse to location G when the eastbound traffic direction is being established causes the pick-up of relay 3WBSR at the exit end, thus causing master code to be cascaded to the entrance end for clearing the entrance signal. However, feed back code is not transmitted from the entrance end E to the exit end G until after the train enters and progressively vacates the sections of the stretch. Since feed back code must first be received at location G before relay 3WBSR can be released to cut off the master code, it is clear that master code will continue to be supplied at location G and it will be impossible to restore the stretch to its normally deenergized condition until the train completely clears the stretch. This is also true during such time as signal ESD is at clear because under this condition, feed back code cannot be supplied at location E because the circuit for relay 2ECTPR is open at front contact 27 of relay 2EBHSR. Accordingly, all that is necessary for permitting a following train to enter the stretch is to have the operator clear signal ESD before the stretch is vacated by the first train. This clearing operation cuts off the feed back code at location E thus preventing receipt of this code at location G which prevents the energization of relays 3WTR and 3WCDR so that relay 3WBSR does not become deenergized. A duplicate cycle of operations is, of course, effective for the westbound traffic direction in which feed back code supplied at location G causes the release of relay 2EBSR once the westbound train vacates the stretch.

At the intermediate location F, I have indicated the control of signals ESF and WSF by showing the control wires (EDG, EHG, and ERG; and WDG, WHG, and WRG) for these signals which control the clear, caution, and stop aspects, respectively, in the usual and well-known manner. It will be noted that at the intermediate location, the signals will normally be dark, becoming lighted only when a route is established and the directional stick relay picks up.

Since an eastbound move has been described in detail and since entirely similar operations are involved in setting up the apparatus for a west bound move, the latter move will be clear without added description.

Looking at the intermediate location F, the initial impulse of steady energy is cascaded beyond this location provided that the relay HR and the directional relay D are both deenergized. The first HR relay to respond to code picks up the directional relay D for that particular direction. When once picked up, the directional relay remains energized over its stick circuit until there exists no further need for code. This condition is determined by the cut-out relay 2COR which is energized only when both EHR and WHR relays are picked up at the same time, that is, when both front contacts 69 and 70 of these relays are closed to complete the pick-up circuit. Relay 2COR will accordingly be picked up when the train has passed the next signal, as indicated by the presence of master code in section 3, and no following train is approaching, as indicated by the presence of reverse code. If, after relay 2COR is picked up, the reverse code is cut off because a following move is being made, nothing happens at the intermediate location except that the COR relay will drop so that the master code will not be cut off. However, if the master code is cut off with relay 2COR picked up, as will occur when the WBSR relay is released, the directional relay will also release so that the intermediate location will become deenergized. Further saving of power can also be effected by using FSA relays to control the energization of the decoding transformers over their front contacts so that these will be energized only if the associated FSA relay is picked up.

In the event of failure of the C. T. C. control equipment, the system of Fig. 1 remains operable under manual control, for which purpose the push buttons PB1 and PB2 at location E have been provided. By depressing push button PB1 at the headblock location, relay 2EHSR will be picked up over an obvious circuit, thus initiating the impulse of steady energy, as in the case of C. T. C. control, which results eventually in the clearing of the headlock signal for that direction, as previously described. If the block is already set up for a move in the opposite direction, relay 2EBSR will be picked up and a suitable lamp at location D can be used to give a warning that this is the case. The purpose served by the push button PB2 is to cancel locally the manual set-up in the event that it is desired not to proceed with the route which has been set up.

Summarizing the basic operation of the system shown in Fig. 1, it will be noted that with the system normally deenergized and unoccupied, operation of a lever at the control office causes selective energization of a traffic direction relay at that field station which is located at the new entrance end of the stretch. Pick-up of the traffic relay closes a momentary circuit which results in the transmission of an impulse of steady energy from the entrance to the exit end. Receipt of the steady energy impulse at the exit end provides an indication at the office that the stretch is unoccupied and results in the application of master code to the exit end of the stretch. This code is cascaded to the entrance end and when there received permits the entrance signal to clear. This code also results in the pick-up of the proper directional stick relay at an intermediate location. As each track section is cleared by the train, master code is applied thereto at the leaving end (the directional stick relay now being up) and this results in the application of feed back code at the entrance end of the stretch. The feed back code is relayed over the track sections as these become bacated and thus follows the train and causes cutting off of the master code at the exit end when the train passes completely out of the stretch. Absence of master code at the exit end results in the deenergization of the track at that end. The deenergizing action is cascaded to the entrance end so that the system is restored to its normally deenergized condition in preparation for a following move or a reversal in the traffic direction.

Referring now to the system shown in Figs. 2*a* and 2*b*, the operation of this system is similar to that described for Figs. 1*a*, 1*b* and 1*c* with the exception that advance pick-up stick relays are used at intermediate locations to provide for following moves, instead of the usual directional stick relays shown in Fig. 1. As in that figure, movement of lever ESL to the R position (for an eastbound move) results in the transmission of a code which energizes terminal 85 and picks up the traffic relay 5EHSR, followed by the pick-up of relay 5ECTPR. The latter relay applies an impulse of steady energy to section 5 during the release interval of relay 5EBHSR. The steady energy picks up relay 5WTR at location L, closing front contact 71 which applies steady energy to relay 6ECTPR, thus repeating the steady energy into section 6. At location M, pick-up of relay 6WTR closes the circuit for relay 7ECTPR at front contact 72 of the repeater relay 6WTRP which itself is energized over front contact 73 of relay 6WTR. Relay 7ECTPR repeats steady energy into section 7, picking up relays 7WTR and 7WFSA, and finally 7WBSR, as before. Master code of the 75 code rate is now applied to section 7, causing relay 7EHR to pick up and to apply 180 code to section 6 which results in 180 code being repeated into section 5. The 180 code causes the eastbound headblock signal ESJ to clear, so that the train may now enter the single track stretch.

After the train progresses into section 5 and approaches signal EL, the east bound approach relay 5EAR will pick up and will energize the approach stick relay 5S (relays 6EHR and 6ED having become previously energized due to the presence of master code at location L). The pick-up circuit for relay 5S includes front contacts 74 and 75 of relays 5EAR and 6ED. Once picked up, relay 5S remains energized after the train enters section 6 and leaves section 5, over a stick circuit which includes its own front contact 76, back contact 77 of relay 6EHR, and the front contact 75 of relay 6ED. Relay 6ED is maintained energized, after relay 6EHR releases, over a circuit which includes front contact 78 of relay 5S, back contact 79 of relay 6EHR, and its own front contact 80. Pick-up of relay 5S applies 75 code to section 5 in the rear of the train due to the coding action of relay 5WCTPR which is energized over a circuit which includes front contact 81 of relay S, back contact 82 of relay 6EHR, and front contact 83 of relay 6ED.

A similar operation will take place at location M when relay 6EAR picks up due to the approach of the train, resulting in the pick-up of the approach stick relay 6S and the application of 75 code to section 6. As soon as section 6 is vacated, the pick-up of relay 6EHR at location L will cause 180 code to be supplied to section 5 over the front point of contact 82. The remaining operation is similar to that described in detail for Fig. 1 and need not be repeated. For simplicity, the apparatus at the headblock locations of Fig. 2 has not been shown as completely as in Fig. 1, but it will be understood that similar apparatus may be used in Fig. 2.

In describing my invention, I have made use of direct current track circuits and have used but two codes, namely, having 75 and 180 impulses per minute. My invention is obviously adaptable to alternating current track circuits and to the use of either a smaller or a larger number of codes which can differ in character from the particular 75 and 180 codes which I have chosen for purposes of illustration.

It will be apparent from the foregoing that I have provided a safe, flexible and comparatively simple system of signaling for single track, two direction operation, in which all of the usual control line wires are eliminated and in which the coded track circuits are normally deenergized. Among the important advantages of the system embodying my invention are the automatic self-restoring features which eliminate the need for the usual traffic control levers and which simplify operation, and the provision of simple means for setting up traffic direction locally from the headblock location for the given direction in case of failure of the C. T. C. portion of the apparatus.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination with a normally deenergized stretch of track over which traffic may move in either direction, said stretch being divided into a plurality of track circuit sections, means effective for establishing traffic in a given direction including means for applying an impulse of current to the rails at the entrance end of the stretch, means for cascading said impulse over said sections to the exit end to thereby check unoccupancy of said stretch, means responsive to the receipt of said impulse at the exit end for supplying a signal control code to the track rails at that end, a headblock signal for said given direction, means for transmitting said code over said sections to said entrance end, and means responsive to the receipt of said code at said entrance end for clearing said headblock signal to permit traffic to enter said stretch.

2. In combination with a normally deenergized stretch of track over which traffic may move in either direction, said stretch being divided into a plurality of track circuit sections, means effective when said stretch is unoccupied for establishing traffic in a given direction including means for supplying a signal control code to the rails at the exit end of said stretch, means for transmitting said signal control code over said sections to the entrance end, means responsive to the receipt of said signal control code at said entrance end for governing the entry of traffic into said stretch, means effective after said stretch becomes occupied for supplying a feed back code to the rails at the entrance end when the track section at said entrance end is cleared by the train, said feed back code being transmitted progressively over the sections of said stretch as these become vacated by the train, and means at the exit end responsive to said feed back code and effective upon the exit of the train from said stretch for discontinuing the supply of said signal control code to thereby restore said stretch to its deenergized condition.

3. In combination with a normally deenergized stretch of track over which traffic may move in either direction, said stretch being divided into a plurality of track circuit sections, means effective for establishing traffic in a given direction including means for applying an impulse of current to the rails at the entrance end of the stretch, means for cascading said impulse over said sections to the exit end to thereby check unoccupancy of said stretch, means responsive to the receipt of said impulse at the exit end for supplying a signal control code to the rails at said exit end, means for transmitting said signal control code to the entrance end, means responsive to the receipt of said signal control code at said entrance end for governing the entry of traffic into said stretch, means for supplying a feed back code to the rails of said stretch in the rear of the train, and means responsive to the receipt of said feed back code at said exit end for discontinuing said signal control code to deenergize said stretch after it becomes vacated by the train.

4. In combination with a normally deenergized stretch of track over which traffic may move in either direction, said stretch being divided into a plurality of track circuit sections, means for establishing traffic in a given direction including means for applying an impulse of current to the rails at the entrance end of the stretch, means for cascading said impulse over said sections to the exit end to thereby check unoccupancy of said stretch, means responsive to the receipt of said impulse at the exit end for supplying a signal control code to the rails at said exit end, means for transmitting said signal control code to the entrance end, means responsive to the receipt of said signal control code at said entrance end for governing the entry of traffic into said stretch, means effective after the stretch becomes occupied and the track section at the entrance end is cleared for supplying a feed back code to the rails of such track section, and means for transmitting said feed back code in the rear of the train after the train vacates each successive section in turn, and means responsive to the receipt of said feed back code at said exit end for discontinuing said signal control code to thereby cause deenergization of said stretch following exit of the train therefrom.

5. In combination with a stretch of track over which traffic may move in either direction, said stretch being divided into a plurality of track circuit sections, a traffic direction relay at each end of the stretch for controlling traffic entering at the respective end, manually controlled means effective for selectively operating one or the other traffic direction relay in accordance with the direction of traffic being established, means effective when a traffic direction relay is operated for supplying an impulse of current to the rails at the associated entrance end of the stretch and cascading said current impulse over said sections to the exit end to check unoccupancy of the stretch, a headblock signal at said entrance end, means controlled by said impulse when received at the exit end for transmitting a signal control code from said exit end over said track sections to said entrance end, and means responsive to the receipt of said signal control code at said entrance end for clearing said headblock signal.

6. In combination with a stretch of track over which traffic may move in either direction, a traffic direction relay at each end of the stretch for controlling traffic entering at the respective end, manually controlled means effective for selectively operating one or the other traffic direction relay in accordance with the direction of traffic being established, means effective when a traffic direction relay is operated for transmitting an impulse of current over the track rails from the associated entrance end of the stretch to the exit end for detecting unoccupancy, a headblock signal at said entrance end, means at said exit end responsive to said impulse of current for transmitting a signal control code over the track rails from said exit end to said entrance end, and means responsive to the receipt of said signal control code at said entrance end for clearing said headblock signal.

7. In combination with a stretch of track over which traffic may move in either direction, eastbound and westbound traffic direction selecting means at the respective entrance ends of said stretch, means for selectively operating said eastbound or westbound direction means to thereby establish eastbound or westbound traffic conditions over said stretch respectively, means effective when either of said selecting means is operated and said stretch is unoccupied for transmitting an impulse of current over the track rails from the associated entrance end to the associated exit end of the stretch for detecting unoccupancy, means at the associated exit and responsive to said impulse of current for transmitting a signal control code over the track rails from said exit end to said entrance end, and traffic governing means responsive to the receipt of said signal control code at said entrance end.

8. In combination with a stretch of track over which traffic may move in either direction, a normally deenergized traffic direction relay at the entrance end of said stretch for a given direction of traffic movement, manually controlled means for energizing said traffic direction relay to establish traffic in said given direction, means effective when said traffic direction relay is energized and said stretch is unoccupied for transmitting an impulse of current over the track rails from said entrance end to the exit end of the stretch for detecting unoccupancy, means at said exit end responsive to said impulse of current for transmitting a signal control code over the track rails from said exit end to said entrance end, and means responsive to the receipt of said signal control code at said entrance end for governing the entry of traffic moving in said given direction into said stretch.

9. In combination with a stretch of track over which traffic may move in either direction, said stretch being divided into a plurality of track circuit sections, a traffic direction relay at each end of the stretch for controlling traffic entering at the respective end, manually controlled means governed from a control office and effective for selectively operating one or the other traffic direction relay in accordance with the direction of traffic being established, means effective when a traffic direction relay is operated for supplying an impulse of current to the rails at the associated entrance end of the stretch and cascading said current impulse over said sections to the exit end to check unoccupancy of the stretch, a headblock signal at said entrance end, means controlled by said impulse when received at the exit end for cascading a signal control code from said exit end over said track sections to said entrance end, means responsive to the receipt of said signal control code at said entrance end for clearing said headblock signal, and emergency manually controlled means at said entrance end effective for operating the traffic relay at that end so as to clear said headblock signal if said stretch is unoccupied and so to permit traffic to enter said stretch.

10. In combination with a stretch of track over which traffic may move in either direction, a traffic direction relay at the entrance end of said stretch for a given direction of traffic movement, manually controlled means governed from a control office for energizing said traffic direction relay to establish traffic in said given direction, means effective when said traffic direction relay is energized and said stretch is unoccupied for transmitting an impulse of current over the track rails from said entrance end to the exit end of the stretch for detecting unoccupancy, means at said exit end responsive to said impulse of current for transmitting a signal control code over the track rails from said exit end to said entrance end, traffic governing means responsive to the receipt of said signal control code at said entrance end, and emergency manually controlled means at said entrance end effective for energizing said traffic direction relay to thereby establish traffic in said given direction.

11. In combination with a stretch of track over which traffic may move in either direction, a traffic direction relay at each end of the stretch for controlling traffic entering at the respective end, manually controlled means governed from a control office for selectively operating one or the other traffic direction relay in accordance with the direction of traffic being established, means effective when a traffic direction relay is operated for transmitting an impulse of current over the track rails from the associated entrance end to the exit end for detecting unoccupancy, means at said exit end responsive to said impulse of current for transmitting a signal control code over the track rails from said exit end to said entrance end, traffic governing means responsive to the receipt of said signal control code at said entrance end, and emergency manually controlled means at said entrance end effective for energizing said traffic direction relay to thereby establish traffic in said given direction.

12. In combination with a normally deenergized stretch of track over which traffic may move in either direction, said stretch being divided into a plurality of track circuit sections, traffic direction control means, means governed by said traffic direction control means for transmitting rail current of a master code over said sections from the exit end to the entrance end of said stretch, means responsive to the receipt of said master code at said entrance end for governing the entry of traffic into said stretch, means effective as each section is cleared by the train for supplying rail current of a master code at the exit end and rail current of a feed back code at the entrance end of each such section, and means controlled by said feed back code automatically effective when the train leaves said stretch for discontinuing the supply of said master code at said exit end so as to discontinue the supply of master and feedback code throughout the stretch to thereby restore said stretch to its normally deenergized condition.

13. In combination with a normally deenergized stretch of railway track divided into a plurality of track circuit sections, manually controlled means for transmitting rail current of a master code over said sections in the direction from the exit end to the entrance end of said stretch, means responsive to the receipt of said master code at said entrance end for governing the entry of traffic into said stretch, means effective as each section is cleared by the train for supplying rail current of a master code at the exit end and rail current of a feed back code at the entrance end of each such section, and means controlled by said feed back code automatically effective when the train leaves said stretch for discontinuing the supply of master and feed back code throughout the stretch to thereby restore said stretch to its normally deenergized condition.

14. In combination with a normal deenergized stretch of railway track, manually controlled means for transmitting rail current of a master code from the exit end to the entrance end of said stretch, traffic governing means responsive to the receipt of said master code at said entrance end, means responsive to occupancy of said stretch for supplying rail current of a feed back code at the entrance end of said stretch, and means controlled by said feed back code automatically effective upon exit of the train from said stretch for discontinuing the supply of said master and feed back code to thereby restore said stretch to its normally deenergized condition.

15. In combination with a normally deenergized stretch of track, said stretch being divided into a plurality of track circuit sections, means for transmitting rail current of a master code over said sections from the exit end to the entrance end of said stretch, traffic governing means responsive to the receipt of said master code at said entrance end for governing the entry of a train into said stretch, means effective when the train passes from one into another of said sections for discontinuing the previously applied master code in said one section and supplying to said one section a more restrictive master code until said other section is cleared by the train, a signal for each section governed in response to the receipt of said more restrictive master code over the associated section for permitting a following train move, means automatically effective when the last section is cleared by the train and the stretch is then unoccupied by a following train for supplying rail current of a feed back code to said last section, and means responsive to the receipt of said feed back code over said last section for discontinuing the supply of said master code to said last section and in turn to the remaining sections of said stretch and so restoring said stretch to its normally deenergized condition.

16. In combination with a normally deenergized stretch of track over which traffic may move in either direction, means for establishing traffic in a given direction over said stretch including means for transmitting an impulse of current over the rails from the entrance end to the exit end to check unoccupancy of said stretch, means responsive to the receipt of said impulse at said exit end for transmitting rail current impulses of a master code from the exit end to the entrance end of said stretch, means responsive to the receipt of said master code at the entrance end for governing the entry of traffic into said stretch, means effective after said stretch becomes occupied for following the train with current impulses of a feed back code transmitted to the rails in the rear thereof, and means responsive to the receipt of said feed back code at said exit end when the train passes out of the stretch for cutting off said master code to restore said stretch to its normally deenergized condition.

17. In combination with a stretch of track over which traffic may move in either direction, said stretch being divided into a plurality of track circuit sections, means for establishing traffic in a given direction over said stretch including means for cascading a single impulse of current over the rails from the entrance end to the exit end of the stretch to check unoccupancy thereof, means responsive to the receipt of said impulse at said exit end for transmitting current impulses of a signal control code over the rails from said exit end to the entrance end of the stretch, and traffic governing means responsive to the receipt of said signal control code at said entrance end.

18. In combination with a stretch of track over which traffic may move in either direction, means for establishing traffic in a given direction over said stretch including means for transmitting uncoded current over the rails from the entrance end to the exit end of said stretch to check unoccupancy thereof, means responsive to the receipt of said uncoded current at said exit end for transmitting coded current over the rails from said exit end to said entrance end of the stretch, and traffic governing means responsive to the receipt of said coded current at said entrance end.

19. In combination with a stretch of track over which traffic may move in either direction, means for establishing traffic in a given direction over said stretch including means for transmitting uncoded current for a predetermined time interval over the rails from the entrance end to the exit end of said stretch to check unoccupancy thereof, said predetermined time interval being sufficient to permit said uncoded current to be received at said exit end, means effective if and only if said uncoded current is received at said exit end for transmitting coded current over the rails from said exit end to said entrance end of the stretch, and traffic governing means responsive to the receipt of said coded current at said entrance end.

20. In combination with a normally deenergized stretch of track over which traffic may move in either direction, said stretch being divided into a plurality of track circuit sections, manually controlled means effective when energized for supplying an impulse of current to the rails at the entrance end of said stretch, means for cascading said impulse over said sections to the exit end of the stretch to check unoccupancy thereof, means at the exit end controlled by said impulse for transmitting rail current impulses of a master code over said sections from said exit end to said entrance end, means responsive to the receipt of said master code at said entrance end for governing the entry of traffic into said stretch, means effective when the first section at said entrance end is cleared by the train for supplying current impulses of a feed back code to the rails of said first section, means for transmitting said feed back code over said sections to the exit end as the train progressively clears said sections, control means at said exit end operated in response to receipt of said feed back code for deenergizing said stretch when the train passes completely out of the stretch, and means effective upon a second energization of said manually controlled means during occupancy of said stretch for cutting off said feed back code to thereby prevent operation of said control means and so prevent deenergization of said stretch so as to permit a following train to pass over said stretch.

21. In a two direction system of signaling for a stretch of single track, two adjoining track circuit sections in said stretch, said sections comprising a right-hand and a left-hand track circuit, an eastbound and a westbound directional stick relay adjacent the junction of said two sections, selectively responsive traffic direction control means for supplying coded rail current at the eastbound exit end of said right-hand track circuit for establishing eastbound traffic direction over said sections and for supplying coded rail current at the westbound exit end of said left-hand track circuit for establishing westbound traffic direction over said sections, means responsive to the exit of a train from one or the other section for supplying coded rail current to the vacated section, an eastbound and a westbound code detecting relay energized in response to the presence of coded rail current in said right-hand or said left-hand track circuit respectively, a pick-up circuit for said eastbound directional stick relay including a front contact of said eastbound code detecting relay and a back contact of said westbound directional stick relay, a pick-up circuit for said westbound directional stick relay including a front contact of said westbound code detecting relay and a back contact of said eastbound directional stick relay, a cut-out relay energized when and only when both said code detecting relays are energized, and a stick circuit for each of said directional stick relays including a back contact of said cut-out relay.

22. In combination with a stretch of track over which traffic may move in either direction, said stretch being divided into a plurality of track circuit sections, a traffic direction relay at each end of the stretch for controlling traffic entering at the respective end, manually controlled means for selectively operating one or the other traffic direction relay in accordance with the direction of traffic being established, means effective when a traffic direction relay is operated for transmitting an impulse of current over the rails from the associated entrance end to the exit end of the stretch for checking unoccupancy thereof, means effective when said impulse is received at the exit end for transmitting rail current impulses of a signal control code from said exit end to said entrance end, control means responsive to the receipt of said signal control code at said entrance end for governing the entry of traffic into said stretch, a normally deenergized advance pick-up directional stick relay adjacent the junction between two adjoining sections, means effective when the train approaches within a predetermined distance of said junction for energizing said directional stick relay, and means effective when said directional stick relay is energized for supplying a signal control code to the rear one of said two sections to cause response of said control means and so permit a following train to pass over said stretch.

23. In combination with a normally deenergized stretch of railway track, said stretch being divided into a plurality of track circuit sections, means for transmitting an impulse of rail current from the entrance end to the exit end of said stretch to check unoccupancy thereof, means at the exit end effective when said impulse is received at that end for transmitting rail current impulses of a signal control code from said exit end to said entrance end, control means responsive to the receipt of said signal control code at said entrance end for governing the entry of traffic into said stretch, a normally deenergized advanced pickup directional stick relay adjacent the junction between two adjoining sections, means effective when the train approaches within a predetermined distance of said junction for energizing said directional stick relay, and means effective when said directional stick relay is energized for supplying a signal control code to the rear one of said two sections to cause response of said control means and so permit a following train to pass over said stretch.

24. In a normally deenergized coded track circuit signaling system, in combination, a stretch of single track having a headblock signal at each end for governing train movement into the stretch, a normally deenergized code following track relay at each end of said stretch, decoding means associated with each track relay and responsive to code following operation of the track relay for governing the indications of the associated signal, a manually operable lever in a remote control office for each headblock signal, a code communication system governed by said signal levers and operating over line wires connecting the control office with a field station at each end of the stretch for permitting the clearing of either selected one of said headblock signals in response to operation of the associated decoding means, normally inactive code transmitting means for each end of the stretch effective when rendered active to transmit coded energy over the track rails toward the other end of the stretch to operate the track relay at that other end, each of said code transmitting means being governed by the signal lever for the headblock signal at the opposite end of the stretch and having its operation initiated when that lever is operated to clear the signal governed thereby, each of said code transmitting means after its operation is initiated continuing in operation until restored, and means governed by each signal lever and effective only when the stretch is not occupied for automatically restoring to its normally inactive condition the code transmitting means controlled thereby.

25. In a normally deenergized coded track circuit signaling system, in combination, a stretch of single track having a headblock signal at each end for governing train movement into the stretch, a normally deenergized code following track relay at each end of said stretch, decoding means associated with each track relay and responsive to code following operation of the track relay for governing the indications of the associated signal, a manually operable lever in a remote control office for each headblock signal, a code communication system governed by said signal levers and operating over line wires connecting the control office with a field station at each end of the stretch for permitting the clearing of either selected one of said headblock signals in response to operation of the associated decoding means, normally inactive code transmitting means for each end of the stretch effective when rendered active to transmit coded energy over the track rails toward the other end of the stretch to operate the track relay at that other end, each of said code transmitting means being governed by the signal lever for the headblock signal at the opposite end of the stretch and having its operation initiated when that lever is operated to clear the signal governed thereby, each of said code transmitting means after its operation is initiated continuing in operation until restored, and means governed by each signal lever for restoring to its normally inactive condition the code transmitting means controlled thereby, each of said last named means being effective only when said stretch is unoccupied and no manual control for clearing the signal governed by the corresponding signal lever is in effect.

26. In a normally reenergized coded track circuit signaling system, in combination, a stretch of single track having a headblock signal at each end for governing train movement into the stretch, a normally deenergized code following track relay at each end of said stretch, decoding means associated with each track relay and responsive to code following operation of the track relay for governing the indications of the associated signal, a manually operable lever in a remote control office for each headblock signal, a code communication system governed by said signal levers and operating over line wires connecting the control office with a field station at each end of the stretch for permitting the clearing of either selected one of said headblock signals in response to operation of the associated decoding means, normally inactive code transmitting means for each end of the stretch effective when rendered active to transmit coded energy over the track rails toward the other end of the stretch to operate the track relay at that other end, each of said code transmitting means being governed by the signal lever for the headblock signal at the opposite end of the stretch and having its operation initiated when that lever is operated to clear the signal governed thereby, each of said code transmitting means after its operation is initiated continuing in operation until restored, and means for restoring each of said code transmitting means to its normally inactive condition effective only provided the stretch is unoccupied and the headblock signal at the opposite end of the stretch is at stop.

27. In a normally deenergized coded track circuit signaling system, in combination, a stretch of single track having a headblock signal at each end for governing train movement into the stretch, a normally deenergized code following track relay at each end of said stretch, decoding means associated with each track relay and responsive to code following operation of the track relay for governing the indications of the associated signal, a manually operable lever in a remote control office for each headblock signal, a code communication system governed by said signal levers and operating over line wires connecting the control office with a field station at each end of the stretch for permitting the clearing of either selected one of said headblock signals in response to operation of the associated decoding means, normally inactive code transmitting means for each end of the stretch effective when rendered active to transmit coded energy over the track rails toward the other end of the stretch to operate the track relay at that other end, each of said code transmitting means being governed by the signal lever for the headblock signal at the opposite end of the stretch and having its operation initiated when that lever is operated to clear the signal governed thereby, each of said code transmitting means after its operation is initiated continuing in operation until restored, and means governed by each signal lever and effective only when the stretch is not occupied and the headblock signal controlled by said signal lever is at stop for automatically restoring to its normally inactive condition the code transmitting means controlled by said signal lever.

28. In a normally deenergized coded track circuit signaling system, in combination, a stretch of single track having a signal at each end for governing train movement into the stretch, a normally deenergized code following track relay and a normally inactive code transmitting means for each end of said stretch, a code sending relay at each end of the stretch effective when operated for causing the associated code transmitting means to supply coded energy over the track rails toward the other end to operate the track relay at that other end, each of said code sending relays when operated remaining operated until restored, a signal clearing relay for each signal governed from a remote control office to permit clearing of the corresponding signal in response to code following operation of the associated track relay, means effective upon operation of either signal clearing relay to permit clearing of the signal governed thereby and operating automatically over the track rails of the stretch to operate the code sending relay at the opposite end of the stretch to provide coded track circuit energy for clearing the corresponding signal, and means at each end of the stretch responsive to code following operation of the track relay at that end of the stretch and effective only when the stretch is unoccupied and the signal governed by said track relay is at stop for automatically restoring the code sending relay at the opposite end of the stretch to thereby restore the coded track circuit equipment to its normally deenergized condition.

29. In a coded track circuit signaling system for a stretch of single track divided into track sections, each of said track sections having a normally deenergized code following track relay and a normally inactive code transmitting means associated with each end of the track section, means responsive to the intermittent coding operation of each track relay except those at the ends of said stretch for causing operation of a code transmitting means to apply driven code pulses to the track rails of the adjacent end of the adjoining track section, means manually controlled from a remote control office for initiating operation of the code transmitting means at either selected end of said stretch and thereby establish a direction of coding through the stretch, and means also manually controlled from the control office and acting automatically over the track rails of the stretch for discontinuing operation of the code transmitting means for the end of the stretch then in operation and thereby restore all of the track relays of the stretch to their normally deenergized condition.

30. In a coded track circuit centralized traffic control signaling system for single track railroads, the combination with a stretch of single track divided into a plurality of track sections and having a head-block signal at each end and intermediate signals at intervals for governing train movement into and through said stretch in either direction, a normally deenergized code following track relay for each end of each track section, decoding means for each signal responsive to the intermittent coding operation of the corresponding track relay for governing the indications of that signal, means responsive to the intermittent coding operation of each track relay except those at the ends of said stretch for applying driven code pulses to the track rails of the adjacent end of the adjoining track section, normally inactive code sending means for each end of the stretch operable to apply driven code pulses to the track rails at the corresponding end of the stretch and thereby establish a direction of coding through the stretch for governing the clearing of signals for one direction of train movement, means manually controlled from a distant control office for initiating operation of the code sending means at either selected end of the stretch and for selectively governing the clearing of the head block signals by their associated decoding means, and means acting over the track rails and effective only if said stretch is not occupied and no manual control for clearing the opposing head block signal is in effect for stopping the operation of the code sending means then in operation to restore the track relays to their normally deenergized condition.

31. In a coded track circuit system of centralized traffic control for a stretch of track having a signal at each end for governing train movement into the stretch, a normally deenergized code following track relay and normally inactive code transmitting means for each end of said stretch, a signal clearing relay for each signal manually energized from a remote control office to permit clearing of the corresponding signal in response to the intermittent coding operation of the corresponding track relay, a code sending stick relay at each end of the stretch initially energized by a prolonged energization of the corresponding track relay for a limited time, stick circuit means for maintaining each code sending relay energized, means effective when a code sending relay is energized for causing operation of the associated code transmitting means to provide a driven code to govern the indications of the signal at the opposite end of the stretch, means effective upon energization of either signal clearing relay by manual control for energizing the track relay at the opposite end of the stretch for said limited time and thereby energize the code sending relay at that end to provide a driven code for clearing the corresponding signal, means effective while a signal clearing relay at either end of the stretch is deenergized and a driven code is being received at that end for transmitting over the track rails of the stretch to the opposite end inverse code pulses during the off periods of the driven code, and means responsive to the operation of a track relay by said inverse code pulses for deenergizing the corresponding code sending relay.

32. In a coded track circuit centralized traffic control system for a stretch of track having a signal at each end governing train movement into the stretch, a normally deenergized track relay for each end of said stretch, decoding means associated with each signal and energized by the intermittent coding operation of the corresponding track relay, a signal clearing relay for each signal energized from a remote control office for governing the clearing of the corresponding signal dependent upon the energization of its associated decoding means, code transmitting means for each end of said stretch, means effective upon energization of either selected signal clearing relay by manual control and acting over the track rails of said stretch to initiate operation of the code sending means at the opposite end of the stretch and thereby provide a driven code for clearing the corresponding signal, and means effective when a signal clearing relay becomes deenergized and the stretch is not occupied for transmitting inverse code pulses during the off periods of the driven code for automatically discontinuing operation of the code sending means at the opposite end of the stretch until its operation is again manually initiated.

33. In a coded track circuit system of centralized traffic control for a stretch of track having signals at the ends governing train movement in opposite directions into said stretch, a code communication system of centralized control including a field station located at each end of said stretch for transmitting control codes under manual control from a distant control office for governing the clearing of said signals, code transmitting means for each end of said stretch rendered effective by the transmission of a start pulse over the track rails of the stretch from the opposite ends, and means responsive to the reception of a control code to clear a signal at either selected end of the stretch for applying a start pulse of limited duration to the track rails of the stretch at the corresponding end.

CRAWFORD E. STAPLES.

REFERENCES CITED

The following references are of record in the file of this patent:

UNITED STATES PATENTS

| Number | Name | Date |
|---|---|---|
| 2,344,573 | Van Horn | Mar. 21, 1944 |
| 2,349,680 | Shields | May 23, 1944 |